June 26, 1928.
L. S. PFOUTS
1,674,991
MECHANISM FOR MEASURING BATCHES OF MATERIAL
Filed July 21, 1922
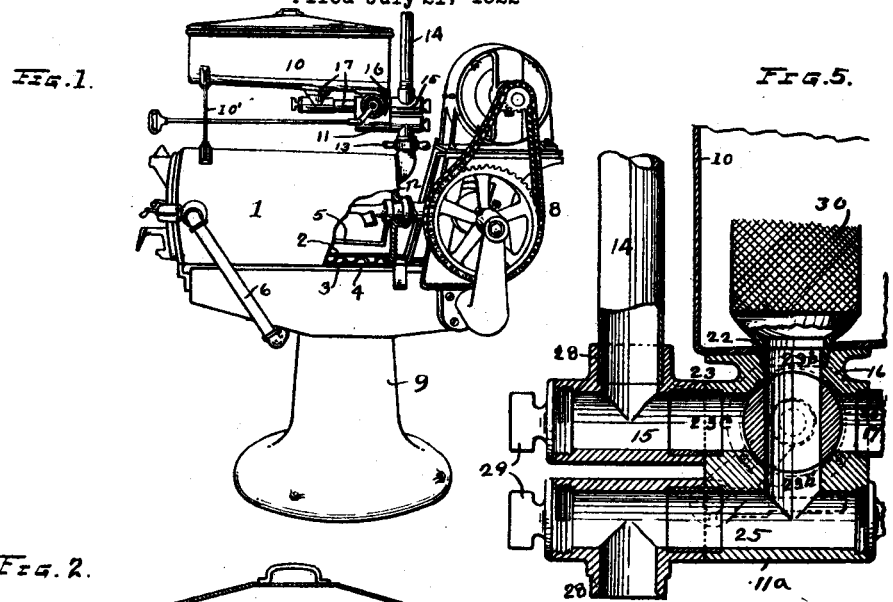
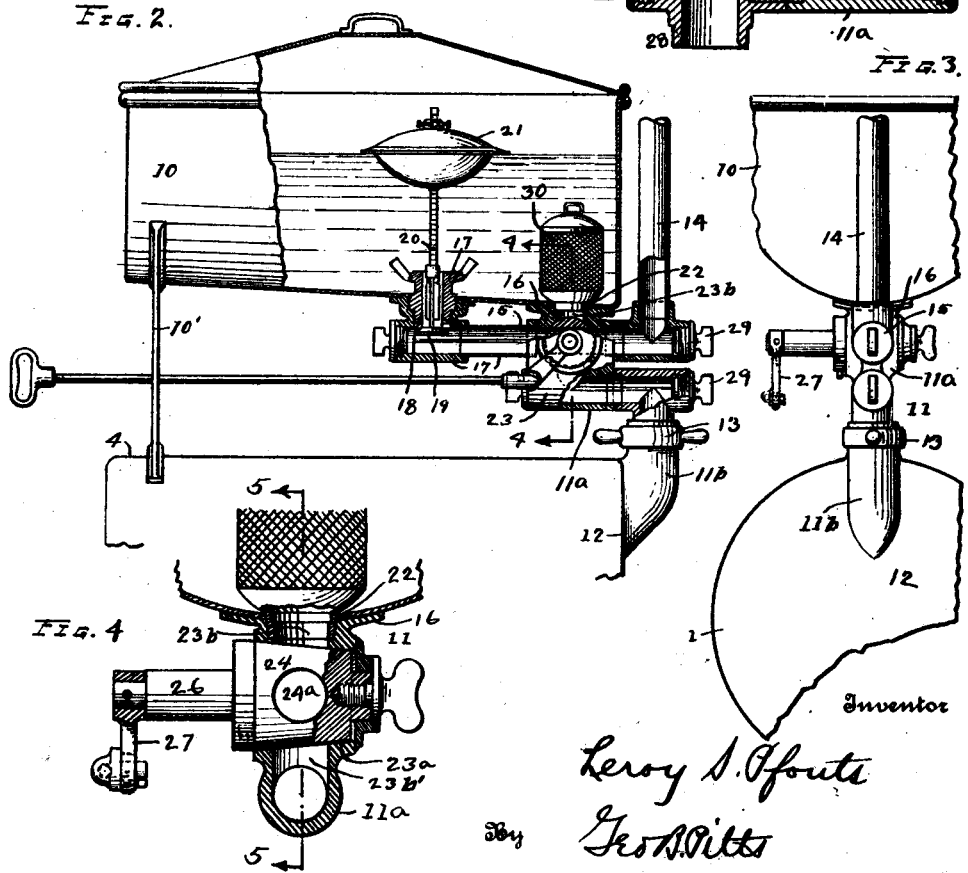
Inventor
Leroy S. Pfouts
By Geo. B. Pitts
Attorney Patented June 26, 1928.

1,674,991

UNITED STATES PATENT OFFICE.

LEROY S. PFOUTS, OF CANTON, OHIO, ASSIGNOR TO THE H. H. MILLER INDUSTRIES COMPANY, OF CANTON, OHIO, A CORPORATION OF OHIO.

MECHANISM FOR MEASURING BATCHES OF MATERIAL.

Application filed July 21, 1922. Serial No. 576,506.

This invention relates to apparatus wherein successive charges or batches of material are treated, more particularly to a mechanism adapted to measure the material and controlling the flow thereof to the measuring mechanism and the treating apparatus, whereby charges or batches of a predetermined quantity may be delivered to and treated in the treating apparatus successively.

The invention is particularly useful in connection with the use and operation of ice cream freezers where it is desired to provide a measured charge of material ready for discharge into the freezing cylinder as soon as it has been emptied of one charge.

One object of the invention is to provide an improved mechanism of this character of relatively simple construction.

Another object of the invention is to provide an improved measuring mechanism and valves therefor, whereby the material may be supplied to the mechanism, cut off and discharged to the treating apparatus in a ready manner.

Other objects of the invention will be apparent to those skilled in the art to which my invention relates from the following description taken in connection with the accompanying drawings.

Referring to the drawings, Fig. 1 is a side elevation of a treating apparatus and a measuring mechanism embodying my invention.

Fig. 2 is a fragmentary view, partly in section.

Fig. 3 is a fragmentary front elevation.

Fig. 4 is a section on the line 4—4 of Fig. 2.

Fig. 5 is a section on the line 5—5 of Fig. 4, but showing the controlling valve in position to permit the discharge of the material from the batch tank to the treating apparatus.

In the drawings, 1 indicates as an entirety a material treating apparatus, such as an ice cream making machine, which may be of any desired form of construction; that shown comprising a horizontal freezing cylinder 2, surrounded by a coil 3 for the circulation of brine or other refrigerant, and a jacket 4 for well known purposes, and an agitating mechanism 5 of any preferred construction. At 1ª, the front head for the cylinder 2 is provided with a valve which controls an opening for the discharge of the material after it is frozen. 6 indicates the supply pipes for the refrigerant. 8 indicates as an entirety the driving mechanism, connected in any desired manner to the elements or devices constituting the agitating mechanism. The cylinder 2 and driving mechanism 8 are mounted in any well known manner on a suitable support indicated as an entirety at 9.

10 indicates a batch tank preferably mounted or supported by means of suitable legs 10' on the jacket 4 for the freezing cylinder 2. 11 indicates a conduit leading from the batch tank 10 to the rear head 12 of the freezing cylinder 2 for conducting the material to be frozen to the latter. The conduit 11 may be made in two sections, one (11ª) section secured to the batch tank 10 and extending inwardly therebelow and the other (11ᵇ) integrally formed with the wall of the head 12. When the conduit 11 is constructed in this manner, the sections are detachably connected by a suitable coupling 13 in a liquid tight manner.

14 indicates a supply pipe leading from any suitable source of supply and provided with a section 15 preferably leading inwardly below the tank 10 from the rear end thereof. At its free end, the pipe section 15 is connected with a casing member 16 in which is mounted a pipe 17. The pipe 17 extends through an opening formed in the bottom of the tank 10 and serves as a conduit or passage for the material from the pipe section 15 into the tank 10. The lower end of the pipe 17 is shaped to form a valve seat 18 for a valve 19. The valve 19 is connected to a stem 20, which extends upwardly through the pipe 17 and has connected to it a float 21 of any preferred form of construction. When the material is supplied to the tank 10, the float rises with the material and carries with it the valve 19 until the latter closes against the seat 18, thus shutting off the supply of the material. The float 21 is preferably adjustably connected to the stem 20, so that it may be positioned thereon at any desired point and thus cause the closing of the valve against its seat when the level of the material reaches the desired height, depending upon the quantity of the material to be measured, thereby regulating the quantity of the material to be supplied to the treating apparatus 1. 22 indicates an opening formed in the bottom of the tank 10 to permit the material to flow therefrom through the conduit 11 into the freezing cylinder 2. 23 indicates a casing or housing member having a chamber 23ª to receive and support a valve 24 and ports or openings 23ᵇ, 23ᵇ′, 23ᶜ, 23ᶜ′, and provided with a conduit section 25 to which the outer or free end of the section 11ª is connected. As shown, (1) the pipe section 15 is connected to the openings 23ᶜ, 23ᶜ′, so that when the valve 24 is in one position (see Fig. 2) with the opening 24ª therethrough in registry with the openings 23ᶜ, 23ᶜ′, the material will flow from the supply pipe 14 through the casing member 23, valve 24, pipe section 15 to the pipe 17, and (2) the casing member 23 is so arranged that the opening 23ᵇ connects with the opening 22 and the opening 23ᵇ′ is connected with the pipe section 25, so that when the valve 24 is in the position shown in Fig. 5, it will cut off the supply of the material through the pipe section 15 and permit the material in the tank 10 to flow therefrom through the opening 22, openings 23ᵇ, 23ᵇ′, conduit sections 11ª, 11ᵇ, to the cylinder 2.

From the foregoing description it will be seen that the valve 24 may be positioned to (1) close the discharge passage from the tank 10 and permit the flow of the material from the pipe 14 into the tank 10, or (2) shut off the supply of the material to the tank 10 and permit the discharge of the material therefrom to the cylinder 2. The valve 24 is provided with a stem 26 carrying an arm 27 to which a rod may be pivotally connected. The rod preferably extends to a point adjacent the front end of the machine where it may be conveniently operated.

As shown in the drawings, the pipe sections or conduits for the material are preferably connected together by couplings 28, the ends of which are open and closed by plugs 29, this arrangement permitting the conduits to be easily and properly cleaned.

30 indicates a strainer which may be provided for straining the material as it flows through the opening 22. The strainer may be of any desired construction, but preferably comprises a cylindrical member having a reduced lower end which fits into the opening 22. The bottom of the tank 10 is inclined downwardly towards its rear end and the discharge opening 22 is arranged between the material inlet pipes 17 and the rear end of the tank 10, so that all of the material constituting a single charge or batch will flow out of the tank 10.

Where the invention is embodied in a mechanism associated with an ice cream freezer, the material supplied by the pipe 17 will be milk or cream used for making ice cream, but where the mechanism is associated with other apparatus, other kinds of liquid materials may be used.

To those skilled in the art of making apparatus or mechanism of the class described, many alterations in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination with a batch tank, of a material supply pipe leading thereto, a discharge pipe leading from said tank, means controlled by the rise of the material in said tank for shutting off the supply of material thereto through said supply pipe, a casing member interposed in said supply pipe and said discharge pipe and provided with pairs of openings connected therewith, respectively, and a valve in said casing member having an opening through it for controlling the flow of the material either through said supply pipe or through said discharge pipe.

2. In apparatus of the class described, the combination with a batch tank, of a material supply pipe leading thereto, a discharge pipe leading from said tank, means controlled by the rise of the material in said tank for shutting off the supply of material thereto through said supply pipe, a casing member interposed in said supply pipe and said discharge pipe and provided with pairs of openings connected therewith, respectively, and a rotary valve in said casing member having an opening through it for controlling the flow of the material either through said supply pipe or through said discharge pipe.

3. In apparatus of the class described, the combination with a batch measuring tank, having a bottom inclined toward one end, of a material supply pipe connected to the bottom of said tank, a discharge pipe connected to the bottom of said tank, between the connection therewith of said supply pipe and the lowermost end of the tank, means controlled by the rise of the material in said tank for shuttitng off the supply of the material thereto through said pipe, a casing member interposed in said supply and discharge pipes and provided with pairs of openings connected therewith, respectively, and a valve in said casing member for controlling the flow of material through either said supply pipe or said discharge pipe.

In testimony whereof, I have hereunto subscribed my name.

LEROY S. PFOUTS.